(12) United States Patent
Lhermitte et al.

(10) Patent No.: US 9,148,607 B2
(45) Date of Patent: Sep. 29, 2015

(54) DVB-T2 BROADCASTING METHOD WITH THE INSERTION OF REGIONAL CONTENT, AND DEVICE USED IN THE METHOD

(75) Inventors: Richard Lhermitte, Rennes (FR); Benoit Chauviere, Montgermont (FR); Eric Deniau, La Baussaine (FR)

(73) Assignee: ENENSYS TECHNOLOGIES, Rennes (FR)

( * ) Notice: Subject to any disclaimer, the term of this patent is extended or adjusted under 35 U.S.C. 154(b) by 179 days.

(21) Appl. No.: 13/814,781

(22) PCT Filed: Jul. 20, 2011

(86) PCT No.: PCT/EP2011/062484
§ 371 (c)(1),
(2), (4) Date: Apr. 22, 2013

(87) PCT Pub. No.: WO2012/019889
PCT Pub. Date: Feb. 16, 2012

(65) Prior Publication Data
US 2013/0215328 A1    Aug. 22, 2013

(51) Int. Cl.
*H04N 5/04* (2006.01)
*H04N 5/38* (2006.01)
*H04H 20/18* (2008.01)
(Continued)

(52) U.S. Cl.
CPC ............... *H04N 5/38* (2013.01); *H04H 20/18* (2013.01); *H04H 20/67* (2013.01); *H04N 21/23424* (2013.01); *H04N 21/23608* (2013.01); *H04N 21/44016* (2013.01); *H04N 21/6112* (2013.01); *H04H 20/106* (2013.01); *H04H 20/30* (2013.01)

(58) Field of Classification Search
CPC ........................................................ H04N 5/04
USPC ............................................................ 370/329
See application file for complete search history.

(56) References Cited

U.S. PATENT DOCUMENTS

2012/0327879 A1*  12/2012  Stadelmeier et al. ......... 370/329

FOREIGN PATENT DOCUMENTS

FR           2932037  A1    12/2009

OTHER PUBLICATIONS

Irini S. Reljin et al.; DVB Standards Development; Telecommunication in Modern Satellite, Cable, and Broadcasting Services, 2009. TELSIKS 2009; 9th International Conference On.; IEEE, Piscataway, NJ, USA, Oct. 7, 2009; pp. 263-272; XP031573513, ISBN: 978-1-4244-4382-6.

(Continued)

*Primary Examiner* — Jefferey Harold
*Assistant Examiner* — Sihar Karwan
(74) *Attorney, Agent, or Firm* — Bachman & LaPointe, P.C.

(57) ABSTRACT

Method of broadcasting a set of national and regional DVB-T2 programs not requiring duplicating the broadcasting of the national programs nor uploading the regional programs to a central point. This method is based on the creation of various T2-MI streams using PLP technology. A T2-MI stream is dedicated to the national programs. T2-MI streams are created for the regional programs. The national programs intended to be replaced by regional programs are isolated in specific pipes. The frame durations and the size of the box are harmonized between the various pipes. Each transmitter receives firstly the national T2-MI stream and at least one regional T2-MI stream. It has a device for replacing at least one pipe of the national T2-MI stream with a pipe of the regional T2-MI stream in order to generate the T2-MI stream to be transmitted.

5 Claims, 4 Drawing Sheets

(51) Int. Cl.
*H04H 20/67* (2008.01)
*H04N 21/234* (2011.01)
*H04N 21/236* (2011.01)
*H04N 21/44* (2011.01)
*H04N 21/61* (2011.01)
*H04H 20/10* (2008.01)
*H04H 20/30* (2008.01)

(56) References Cited

OTHER PUBLICATIONS

DVB Organization; CM1020 T2 Modulator Interface.pdg; DVB, Digital Video Broadcasting, c/o EBU 17A Ancienne Route—CH-1218 Grand Saconnex, Geneva, Switerland; Feb. 20, 2009; XP017825914; p. 6.

* cited by examiner

DVB-T2 BROADCASTING METHOD WITH THE INSERTION OF REGIONAL CONTENT, AND DEVICE USED IN THE METHOD

BACKGROUND

The present invention concerns the field of methods of broadcasting television programs and the devices used in such methods. In particular, the invention proposes a broadcasting method for personalizing program streams for broadcast zones covered by a transmission network on a single modulation frequency in accordance with the DVB-T2 (Digital Video Broadcast—Terrestrial version 2) standard, the second version of the terrestrial video broadcast standard, or any related standard.

The networks for broadcasting digital services on a single modulation frequency or SFN networks (Single Frequency Networks) can be generalised in a certain number of broadcasting systems. There are for example the DVB-T (Digital Video Broadcasting—Terrestrial) broadcasting standards: "ETSI EN 300 744 V1.5.1, Digital Video Broadcasting (DVB); DVB-H (Digital Video Broadcasting—Handheld): "ETSI EN 302 304, DVB-H—Transmission System for Handheld Terminals"; or the Chinese standard DTMB (Digital Terrestrial Multimedia Broadcast) formerly called DMB-T/H (Digital Multimedia Broadcast—Terrestrial/Handheld) which use such SFN broadcasting networks.

The DVB organization has now standardized a second version for broadcasting television programs on a terrestrial network, under the name DVB-T2 ETSI EN302 755 V 1.2.1, and the invention fits in the context of this standard.

SFN networks are characterised in that the broadcasting of the services is effected by transmitting the same data stream by different transmitters on a single modulation frequency. Because of this, it is necessary for these different transmitters to receive exactly the same content and are finely synchronized together in order to avoid generating interference in the places situated at the junction of the coverage zones of the different transmitters.

This synchronization between the different SFN transmitters may, for example, be achieved by inserting, in the stream distributed to these transmitters, synchronization packets such as T2-MI (T2-Modulator Interface MIP), and MIP (Mega-frame Initialization Packet) packets of the DVB-T2 timestamp type, which correspond in the DVB-T2 standard to the timestamps used in the DVB-H and DVB-T standards. This mechanism is described in the document: "Digital Video Broadcasting (DVB); DVB mega-frame for single frequency network (SFN) synchronization modulator interface (T2-MI) for a second generation digital terrestrial television broadcasting system (DVB-T2)" of the ETSI (European Telecommunications Standards Institute) under the reference ETSI TS 102 773 V1.1.1 (2009-09). The transmission point receiving the stream is then synchronized on the stream received, for example by means of these T2-MI packets of the DVB-T2 timestamp type. This synchronization of the transmission point on the stream received, giving rise to the synchronization together of all the transmission points, is called the SFN synchronization of the transmission point.

SFN broadcasting is characterised by the definition of SFN areas. An SFN area is a geographical zone covered by a set of transmitters, the number of which is greater than or equal to one. These transmitters are finely synchronized and transmit exactly the same data stream on the same frequency.

The broadcasting of a set of programs in a data stream over a geographical zone is typically organized from a central point. The geographical zone covered is typically composed of a plurality of SFN areas. The plurality of programs broadcast comprises programs intended for all the zone covered and programs specific to a given region. The region being defined here as a set, possibly a single one, of SFN areas within the zone covered by the broadcasting and within which the programs broadcast are the same. National programs are usually spoken of in respect of programs broadcast over the whole of the zone and regional programs for programs broadcasted only over one or more regions.

The most simple solution for broadcasting these programs is to create one stream per region. This stream is composed, for each region, of all the national programs and the regional programs specific to this region. These various streams are then broadcast from the central transmission point and broadcast to the regions concerned. This solution poses a first problem, which relates to the duplication of the broadcasting of the national programs. This is because the typical broadcasting means is the satellite, the solution described multiplies the broadcasting of the national programs by the number of regions whereas ideally a single broadcasting of these programs could suffice. However, satellite bandwidth is expensive. A second problem relates to the fact that regional programs are typically available at the regions. The creation of the various streams therefore requires uploading these regional streams to the central transmission point in order to constitute the various streams necessary.

SUMMARY OF THE INVENTION

The invention aims to solve the above problems by a method of broadcasting a set of programs, national and regional, not requiring duplication of the broadcasting of the national programs nor uploading of the regional programs to a central point. This method is based on the creation of various T2-MI streams using the technology of physical layer pipes defined in the DVB-T2 or related standard, and called PLP (Physical Layer Pipe), the mechanism described in the document "Digital Video Broadcasting (DVB); Frame structure channel coding and modulation for a second generation digital terrestrial television broadcasting system (DVB-T2); ETSI EN 302 755 V1.1.1 (2009-09)". One T2-MI stream is dedicated to the national programs. T2-MI streams are created for the regional programs. The national programs intended to be replaced by regional programs are isolated in specific pipes. The durations of frames and the size of blocks are harmonized between the various pipes. Each transmitter receives firstly the national T2-MI stream and at least one regional T2-MI stream. It has means for replacing at least one pipe of the national T2-MI stream by a pipe of the regional T2-MI stream in order to generate the T2-MI stream to be transmitted.

The invention concerns a method of broadcasting television programs according to the DVB-T2 or related standard, the broadcasting having to cover a broadcast zone, the broadcast zone comprising a set of broadcast areas covered by a set of finely synchronized transmitters transmitting on the same frequency, some programs being intended to be broadcast over the whole of the zone are called national programs, the broadcast zone comprising a set of regions within which the broadcast programs are the same, some programs being intended to be broadcast over one or more regions only are called regional programs, which comprises a step of generating a national T2-MI stream containing the national programs, the programs intended to be replaced being isolated within a physical layer pipe; a step of generating one or more regional T2-MI streams containing the regional programs, each regional T2-MI stream containing the regional program specific to a region, the said regional programs being isolated within a physical layer pipe; a step of broadcasting the national T2-MI stream and at least one regional T2-MI stream intended for each transmitter of the broadcast region and a step of recomposing the T2-MI stream, at each transmitter, in order to replace at least one physical layer pipe of the national T2-MI pipe with a physical layer pipe of the regional T2-MI stream, in order to generate the T2-MI final stream that is to be transmitted by the said transmitter.

According to a particular embodiment of the invention, the T2-MI streams being divided into frames, each frame being composed of baseband blocks, the regional T2-MI streams are generated with a frame duration equal to the frame duration of the national T2-MI stream and with a baseband block size equal to the baseband block size of the national T2-MI stream.

According to a particular embodiment of the invention, the National T2-MI stream is generated by a national network headend and the Regional T2-MI streams by regional network headends placed in the regions.

According to a particular embodiment of the invention, the step of recomposition of the T2-MI stream is configured by means of configuration information transmitted in at least one T2-MI stream received by means of the T2-MI protocol extension.

The invention also concerns a stream recomposition device according to the DVB-T2 or related standard, which comprises means for receiving a first T2-MI stream containing a plurality of physical layer pipes; means for receiving a second T2-MI stream containing at least one physical layer pipe; means for synchronizing the two T2-MI streams, the frame duration of the two T2-MI streams being equal, the size of the baseband blocks being equal, and means for replacing, in the first T2-MI stream, baseband blocks of a first physical layer pipe with the baseband blocks of a second pipe contained in the second T2-MI stream.

According to a particular embodiment of the invention, the device comprises means for receiving configuration information contained in at least one of the T2-MI streams received by means of the T2-MI protocol extension.

BRIEF DESCRIPTION OF THE DRAWINGS

The features of the invention mentioned above, as well as others, will emerge more clearly from a reading of the following description of an example embodiment, the said description being given in relation to the accompanying drawings, among which.

DETAILED DESCRIPTION OF THE PREFERRED EMBODIMENT(S)

Various solutions can already be put in place for achieving regionalization in a terrestrial digital broadcast system mainly using DVB-T2. On the other hand, these solutions are not optimized.

There exist mainly two known architectures, centralized architecture, and architecture distributed at regional level.

Figure 1:
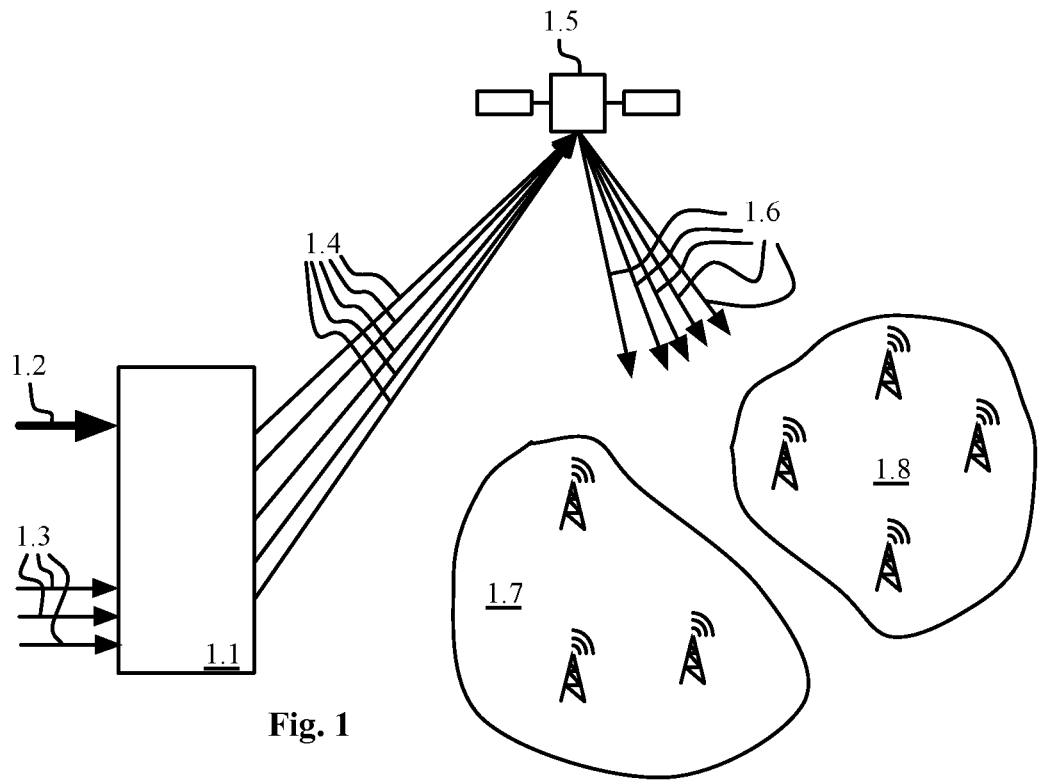
FIG. 1 illustrates a first known solution for broadcasting national and regional programs over a geographical zone.

The first architecture is illustrated by FIG. 1. This is a centralized architecture. All the contents of programs are aggregated at a central point. This central point is called the headend. Each region must therefore transmit its regional programs to the headend so that the various regional streams are created at this headend.

The headend comprises a device 1.1 or rather a set of devices, responsible for creating the streams. This device receives as an input firstly a set 1.2 of programs referred to as national, since they are intended to be broadcast over the whole of a zone representing typically a country. It is necessary to understand here that national programs and countries are spoken of but that it is a case only, from a technical point of view, of a broadcasting zone. This zone may be more limited than a national territory or on the contrary several countries sharing the same broadcasting system.

The device 1.1 also receives as an input one or more regional programs 1.3. Here again, we speak of region, which it is necessary to understand within the meaning of the patent as a unified broadcasting zone. That is to say a zone where the same set of programs must be broadcast.

The device creates a set of streams 1.4. The DVB standard in the first version thereof defines a transport stream format referred to as a TS stream (Transport Stream), this stream is directly formed of a multiplex of the various programs. The DVB standard in version 2 thereof defines a new stream format called T2-MI stream. A T2-MI stream consists of a set of isolated physical layer pipes. Each pipe contains a multiplex of programs corresponding to a TS stream within the meaning of version 1 of the standard. Typically one T2-MI stream per region is created in this solution. The T2-MI stream is therefore composed of the various programs that are to be broadcast over a given region. The figure shows two regions 1.7 and 1.8, each composed of an SFN area. It should therefore be understood that a region may be composed of one or more SFN areas.

The broadcasting occurs typically by satellite 1.5, which re-transmits the various T2-MI streams 1.6 to the regions. Satellite broadcasting is only one example, any other broadcasting means being able to be used. Satellite offers the advantage of affording a wide coverage of a set of potentially numerous transmitters remote from one another. According to the territory to be covered, broadcasting by optical fibre can for example be envisaged.

Each T2-MI stream, because it must comprise all the programs intended for a given region, comprises firstly all national programs that must be broadcast everywhere and secondly all the regional programs intended for the region aimed at. It can easily be seen that the broadcasting of the national programs is duplicated in each of the T2-MI streams created. This duplication proves particularly prejudicial in the case of satellite broadcasting because of the cost of the bandwidth.

The regional programs 1.3 of the various regions must be available at the headend 1.1. It is therefore necessary to transfer this program, typically created at the regional level, to the central headend of the zone. This transfer is also expensive.

Figure 2:
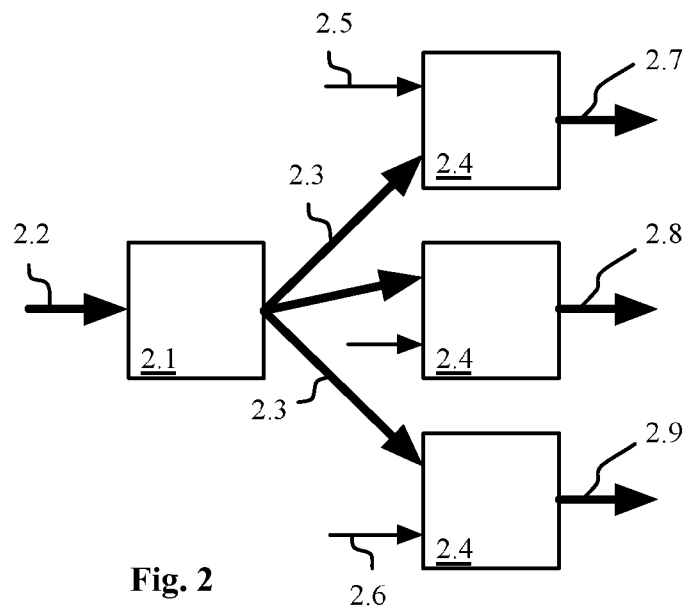
FIG. 2 illustrates a second known solution for broadcasting national and regional programs over a geographical zone.

FIG. 2 illustrates another known architecture for broadcasting regionalized DVB-T programs. There is a national headend 2.1 that takes as an input all the national programs 2.2. This national headend generates a single T2-MI stream 2.3 of national programs that is then broadcast to the regions. At each region, there is at least one regional headend 2.4. This regional headend receives as an input firstly the T2-MI stream of national programs 2.3, but also one or more regional programs 2.5. The DVB-T2 standard enables one or more additional programs to be added to an existing T2-MI stream (Digital Video Broadcasting (DVB); Implementation guidelines for a second generation digital terrestrial television broadcasting system (DVB-T2); DVB Document A133 June 2010 20102010Ds 6.2.6 "The concept of a T2-system", in particular FIG. 26: "Transmissions in a T2-system" and section 7.6 "Regional/local content insertion"). The regional programs are then received typically in the form of a TS transport stream rather than in the form of a T2-MI stream. The regional headend then generates a regional T2-MI stream 2.7, 2.8 and 2.9, which comprises the national programs and the regional program or programs specific to the region in question. It will be noted that this architecture solves the problem of the uploading of the regional programs at the national headend. On the other hand, it will be noted that the national programs are broadcast for a first time between the national headend and the regional headends. They are broadcast a second time within the regional T2-MI streams between the regional headends and the various transmitters within the region. Especially as this second broadcasting often requires the use of satellite for guaranteeing access to the numerous transmitters and re-transmitters in a region, some being able to be difficult to connect to a cabled network.

The use of this architecture in the DVB-T2 context is carried out in the following manner. The regional headend typically receives as an input a T2-MI stream that contains the national programs and, optionally in different pipes, the programs intended to be replaced by regional content. This regional content is typically received in the form of transport streams (TS streams). The data contained in the TS streams must then be reassembled in the form of T2-MI packets that are to be inserted in replacement for baseband blocks of the T2-MI multiplex. It is a case here of re-multiplexing the T2-MI stream. This operation is carried out at a single point, the regional headend, for a given SFN area. This is because it is typically non-deterministic and could not be carried out simply at the transmitters for example.

Figure 3:
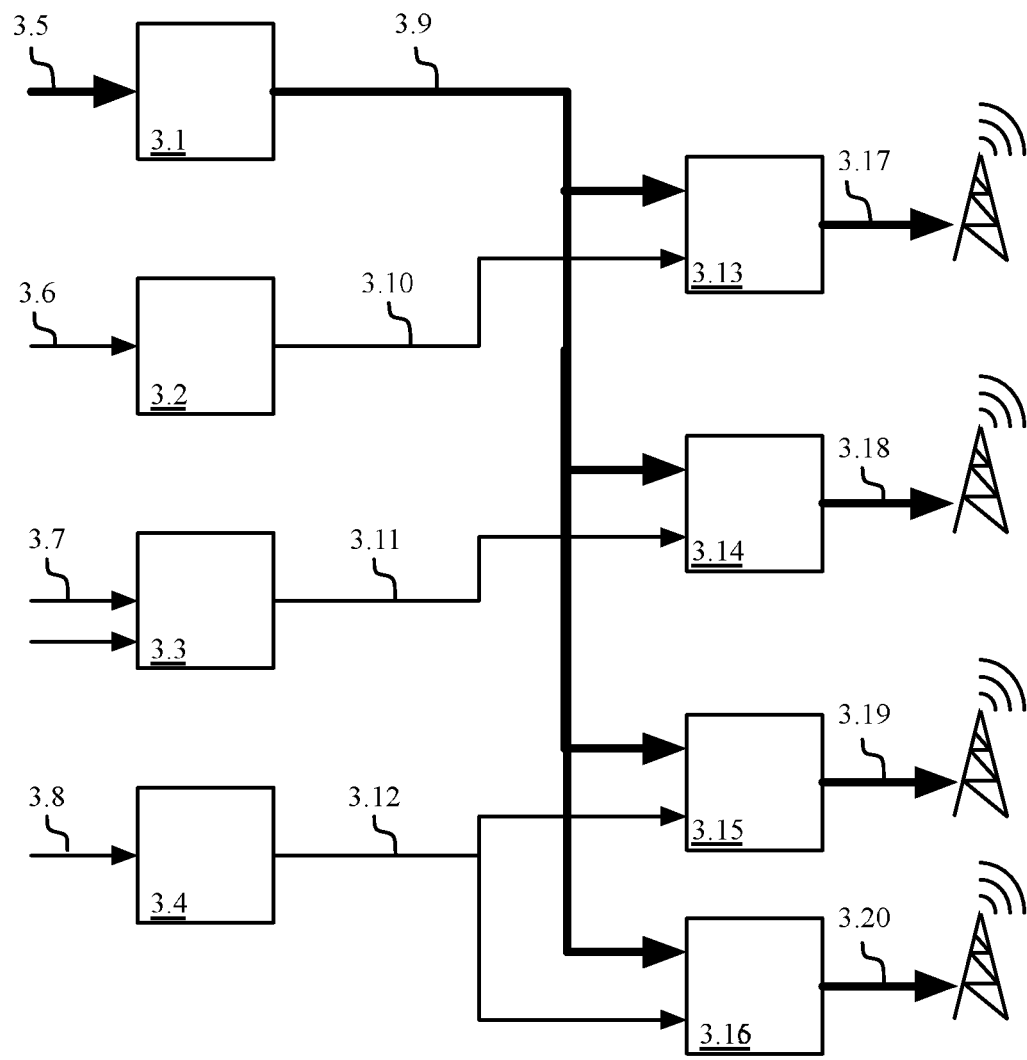
FIG. 3 illustrates an example of broadcasting architecture according to the invention.

The architecture according to the invention is illustrated in FIG. 3. There is a regional headend 3.1 which, as in the previous architecture, receives as an input a set of national programs 3.5 and generates a T2-MI stream of national programs 3.9. There are also regional headends 3.2, 3.3 and 3.4 that receive regional programs 3.6, 3.7 and 3.8 that generate regional T2-MI streams 3.10, 3.11 and 3.12. These regional headends are advantageously situated in each region but they can be situated anywhere on the territory. These various T2-MI streams are broadcast to the transmitters of the various regions. Each transmitter is equipped with a T2-MI stream recomposition device according to the invention 3.13, 3.14, 3.15 and 3.16, which receives as an input firstly the national T2-MI stream and secondly the regional T2-MI stream corresponding to the region to which the said transmitter belongs. This recomposition device is responsible for replacing, within the national T2-MI stream received, some pipes containing programs with one or more pipes containing regional programs received in the regional T2-MI stream. It generates a T2-MI stream 3.17, 3.18, 3.19 and 3.20 that comprises firstly the national programs and secondly the regional programs. These T2-MI streams are directly transmitted by the transmitter connected to the T2-MI stream recomposition device.

It will be noted that this architecture requires a single broadcasting of each program between the headend concerned, national and regional, and the final transmitter intended for transmitting the regional multiplex. It also makes it possible, through an advantageous placing of the regional headends within the regions, to avoid an uploading of the regional programs at the national headend.

This architecture requires taking into account certain constraints in order to be functional. We will now detail these constraints, the particular conformation of the various T2-MI streams and the detailed functioning of the device recomposing the T2-MI streams.

Figure 4:
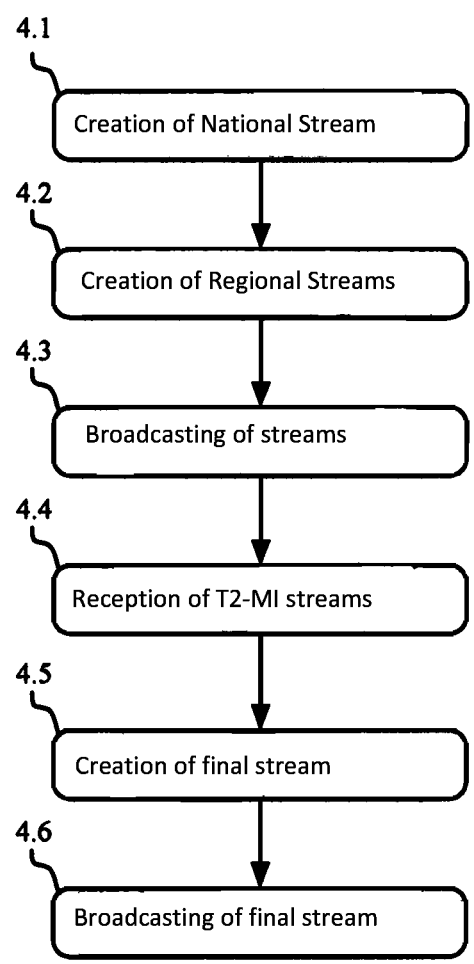
FIG. 4 illustrates the broadcasting method according to the invention.

FIG. 4 illustrates the program broadcasting method according to an example embodiment of the invention. During step 4.1, the national T2-MI stream is generated. This T2-MI stream includes the programs that are to be broadcast over the whole of the territory. This T2-MI stream is in accordance with the DVB-T2 or related standard. In particular, use is made of the physical layer pipe or PLP technology. These pipes were included in the standard to make it possible to separate different contents in the same multiplex. Typically they make it possible to differentiate high-definition video, conventional video or radio. The various pipes are completely independent and can be broadcast according to broadcasting parameters such as modulation parameters. The T2-MI stream can comprise several of these pipes designed to isolate the broadcasting of each type of content according to the broadcasting parameters that are suited to it.

The invention uses the pipe mechanism for quite another thing. Provision is made for isolating, in a pipe of the national T2-MI stream, all the programs actually intended for national broadcasting. National programs that will be able to be replaced in at least one region by a regional program are isolated in specific pipes. Schematically, a "large" pipe that contains the programs actually broadcast in all the regions and a plurality of "small" pipes isolating each program that can be replaced in at least one region are therefore found in the national T2-MI stream.

Advantageously, "empty" pipes that are created only in order to be replaced by regional programs are created in the national T2-MI stream as required. These pipes are sized to correspond to the pipe containing the replacement program. The blocks are then for example filled with padding data.

During a step 4.2, the regional headends constitute the T2-MI streams comprising the program or programs specific to a given region. Each program is isolated in a particular pipe. It is important here to parameterize the T2-MI stream in a way that is compatible with the national T2-MI stream. In particular, a stream according to the DVB-T2 standard defines frames (T2 Frame according to the vocabulary of the standard) provided with a frame period, this frame period must be identical to what is chosen for the national T2-MI stream. Likewise, the pipes are transported in frames in the form of data blocks (Baseband Frame according to the vocabulary of the standard) the size of which is parameterizable. It is necessary for the size of the blocks of the regional T2-MI streams to be identical to the one parameterized for the national T2-MI stream. This point will be returned to in detail during the description of the T2-MI stream recomposition device.

During step 4.3, the national T2-MI stream and the various regional T2-MI streams are broadcast to the transmitters in the various regions. This broadcasting can be done by any broadcasting channel such as satellite, which makes it possible easily to cover a large zone, or an optical fiber network. The purpose is here to bring the national T2-MI stream and the regional T2-MI stream concerned to each transmitter in a region.

During step 4.4, the two T2-MI streams, the national and the regional concerned, are received at each transmitter by a T2-MI stream recomposition device.

During step 4.5, the device for recomposing the T2-MI streams generates the final T2-MI stream by replacing, in the national T2-MI stream, one or more national programs with one or more regional programs received in the regional T2-MI stream. The replacement unit is here the physical layer pipe or PLP. The replacement takes place on the basis of the replacement of the blocks making up a pipe or the national T2-MI stream with blocks of another pipe of the regional T2-MI stream. This operation being carried out at each transmitter in the same SFN zone, it is essential for the T2-MI streams generated to be perfectly synchronized and for the data that make them up to be perfectly the same to within a byte.

This final T2-MI stream is then broadcast by the transmitters.

In this way, each program is broadcast only once between the headend that manages it, national or regional, and the final transmitters.

Figure 5:
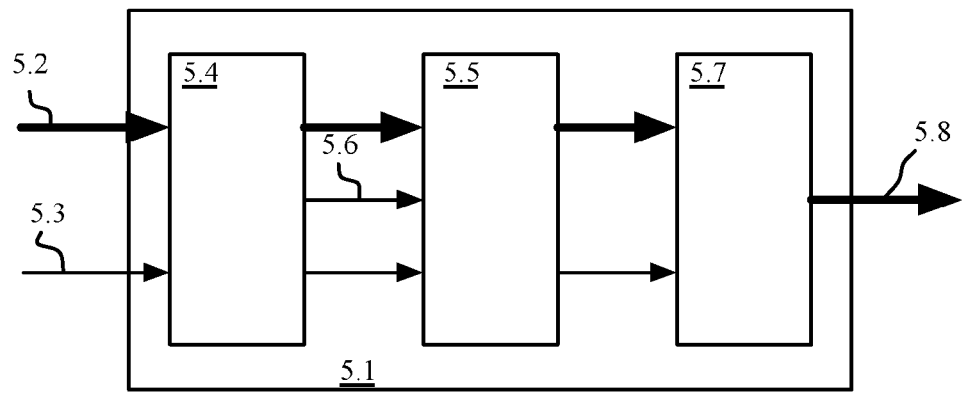
FIG. 5 illustrates the architecture of a device for exchanging pipes between two T2-MI streams received for generating an output T2-MI stream according to an example embodiment of the invention.

The T2-MI stream recomposition device 5.1 is illustrated by FIG. 5. It receives as an input a national T2-MI stream 5.2 and a regional T2-MI stream 5.3. A first stage 5.4 aims to perfectly synchronize the two T2-MI streams. These T2-MI streams are to the DVB-T2 format called T2-MI. The stage 5.4 commences by reading the configuration information contained in the T2-MI packets. It recovers the two T2-MI streams and analyzes the frames and blocks. It next uses the time information of the T2-MI stream, in particular the timestamps, to determine the frame numbers to synchronize. This information 5.6 is passed to the synchronization stage 5.5. The latter then performs the synchronization of the frames and the identification of the frame numbers. The stage 5.7 carries out the replacement proper of the blocks in order to generate the final T2-MI stream 5.8. This final T2-MI stream is synchronized on the national T2-MI stream received. The synchronization can be done, for example, according to the embodiment described in the French patent application published under the number FR 2932037.

Figure 6:
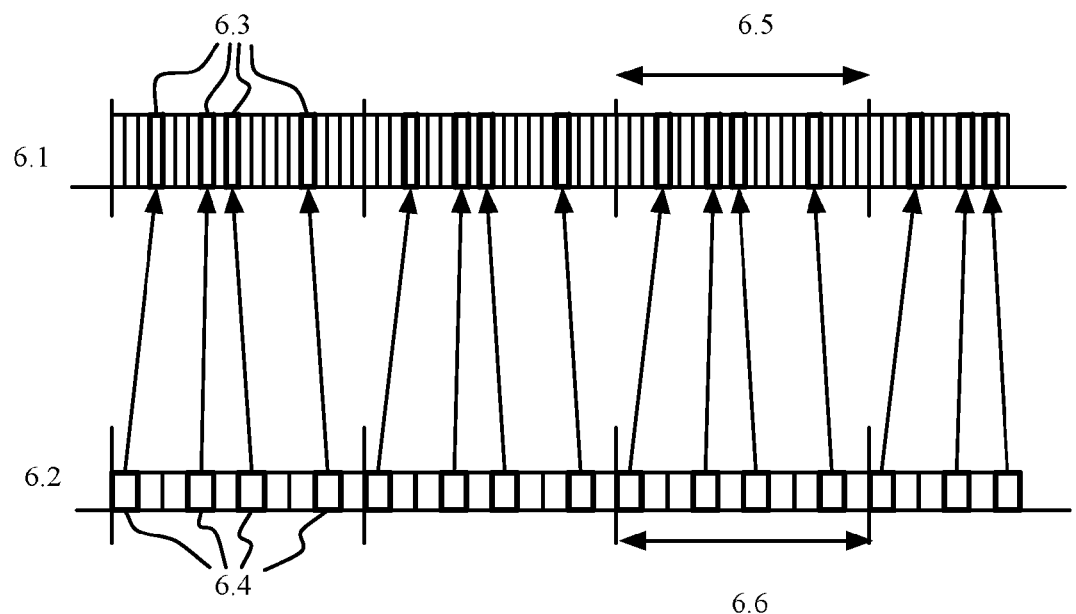
FIG. 6 illustrates the T2-MI stream recomposition method.

The actual replacement of the blocks takes place in the example embodiment of the invention as illustrated by FIG. 6. The T2-MI stream 6.1 represents the national T2-MI stream, while the T2-MI stream 6.2 represents the regional T2-MI stream. It will be noted that the two T2-MI streams have the same frame duration 6.5, 6.6 and are perfectly synchronized at these frames. Each frame transports baseband blocks, each block belonging to one of the pipes. All the blocks have the same size, the size of the various pipes transported being taken into account by the number of blocks within the frame for each pipe. The blocks 6.4 of the pipe containing the replacement program in the regional T2-MI stream replace the blocks 6.3 of the program to be replaced in the national T2-MI stream.

The configuration of the T2-MI stream recomposition devices is carried out by means for the extension of the T2-MI protocol. This makes it possible to keep the transmitted stream completely compatible with the DVB-T2 standard but to use an extension of this protocol for conveying information specific to the regionalization. This information comprises the designation of the services to be replaced for example. The regionalization configuration is carried out typically at the regional headend. However, it can just as well be envisaged carrying out this configuration at the national headend since in all cases the T2-MI protocol is used.

It should be noted that both the broadcasting method and the functioning of the T2-MI stream recomposition device requires no proprietary mechanism. They are implemented by cleverly using the mechanisms offered by the standard. Some of these mechanisms, such as the physical layer pipes, are diverted from their prime function.

This block replacement method with synchronization issuing from the time information and frame numbers is then deterministic. Which is not the case when the regional contents are received in the form of TS streams that must be re-multiplexed in an existing T2-MI stream. By virtue of this determinism, all the T2-MI stream recomposition devices in the same region generate exactly the same signal, which guarantees non-interference with the SFN signal.

The invention claimed is:

1. Method of broadcasting television programs according to the DVB-T2 or related standard, the broadcasting having to cover a broadcasting zone, the broadcasting zone comprising a set of broadcasting areas covered by a set of finely synchronized transmitters transmitting on the same frequency, some programs being intended to be broadcast over a whole of the broadcasting zone are called main programs, the broadcasting zone comprising a set of regions in which the programs broadcast are the same, a region consisting of at least one set, of broadcasting areas, some programs being intended to be broadcast over at least one specific region only are called secondary programs, the method comprises the following steps:

a step of generating a T2-MI stream containing the main programs, the main programs intended to be replaced are isolated within physical layer pipes, durations of frames and size of blocks being harmonized between the physical layer pipes;

a step of generating at least one T2-MI stream containing the secondary programs, each regional T2-MI stream containing the secondary program specific to a region, said secondary programs being isolated within a physical layer pipe;

a step of broadcasting the T2-MI stream containing the main programs and at least one T2-MI stream containing the secondary programs intended for at least one transmitter in the broadcasting zone; and a step of T2-MI stream recomposition, at each said at least one transmitter, to replace baseband blocks of at least one physical layer pipe of the T2-MI stream containing the secondary programs with baseband blocks of a physical layer pipe of the T2-MI stream in order to generate a final T2-MI stream that is to be transmitted by said at least one transmitter.

2. Broadcasting method according to claim 1, wherein the T2-MI stream containing the main programs is generated by a national headend and the T2-MI streams containing the secondary programs by regional headends placed in the regions.

3. Broadcasting method according to claim 1, wherein the T2-MI stream recomposition step is configured by means of configuration information transmitted in at least one T2-MI stream received by means of a T2-MI protocol extension.

4. Stream recomposition device according to the DVB-T2 or related standard, comprising:

means for receiving a first T2-MI stream containing a plurality of physical layer pipes;

means for receiving a second T2-MI stream containing at least one physical layer pipe;

means for synchronizing the T2-MI streams, frame durations and size of blocks being harmonized between the pipes; and means for replacing, in the first T2-MI stream, baseband blocks of a first physical layer pipe with baseband blocks of a second pipe contained in the second T2-MI stream.

5. The stream recomposition device according to claim 4, comprising means for receiving configuration information contained in at least one of the T2-MI streams received by means of a T2-MI protocol extension.

\* \* \* \* \*